United States Patent [19]
Carey

[11] Patent Number: 5,906,218
[45] Date of Patent: May 25, 1999

[54] ELECTRIC-TO-PRESSURE CONVERTERS

[75] Inventor: David C Carey, Wetherby, United Kingdom

[73] Assignee: Watson Smith Limited, Leeda, United Kingdom

[21] Appl. No.: 08/878,196

[22] Filed: Jun. 18, 1997

[30] Foreign Application Priority Data

Jun. 19, 1996 [GB] United Kingdom ............... 96127501

[51] Int. Cl.⁶ .................................................. F16K 31/08
[52] U.S. Cl. ..................... 137/82; 251/129.01; 251/905
[58] Field of Search ................... 137/82; 251/129.01, 251/905

[56] References Cited

U.S. PATENT DOCUMENTS

| | | | |
|---|---|---|---|
| 3,621,862 | 11/1971 | Wojtecki | 137/82 |
| 3,937,242 | 2/1976 | Eckert | 137/625.65 X |
| 4,595,029 | 6/1986 | Roth | 137/82 |

FOREIGN PATENT DOCUMENTS

| | | | |
|---|---|---|---|
| 2500531 | 7/1975 | Germany | 251/905 |
| 100811 | 9/1962 | Norway | 251/905 |

*Primary Examiner*—Gerald A. Michalsky
*Attorney, Agent, or Firm*—Pillsbury, Madison & Sutro, LLP

[57] ABSTRACT

A relatively compact and vibration-insensitive electric-to-pressure converter includes an annular flexure from which an annular electromagnetic coil depends into an annular gap defined by the pole pieces of a permanent magnet assembly. A compressed air exhaust nozzle is located below the central region of the flexure which controls the rate of exhaust of air from the nozzle, and therefore the output pressure of the converter, in dependence upon the magnitude of an electrical input current applied to the coil.

13 Claims, 4 Drawing Sheets

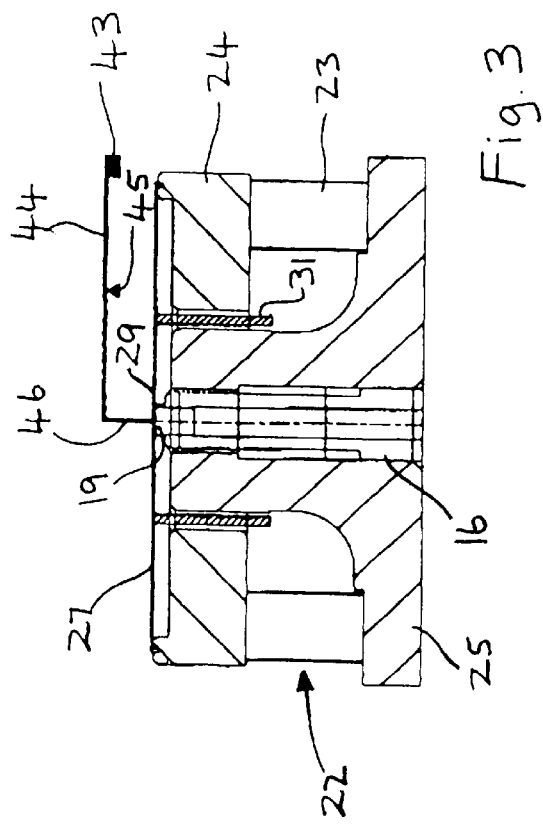
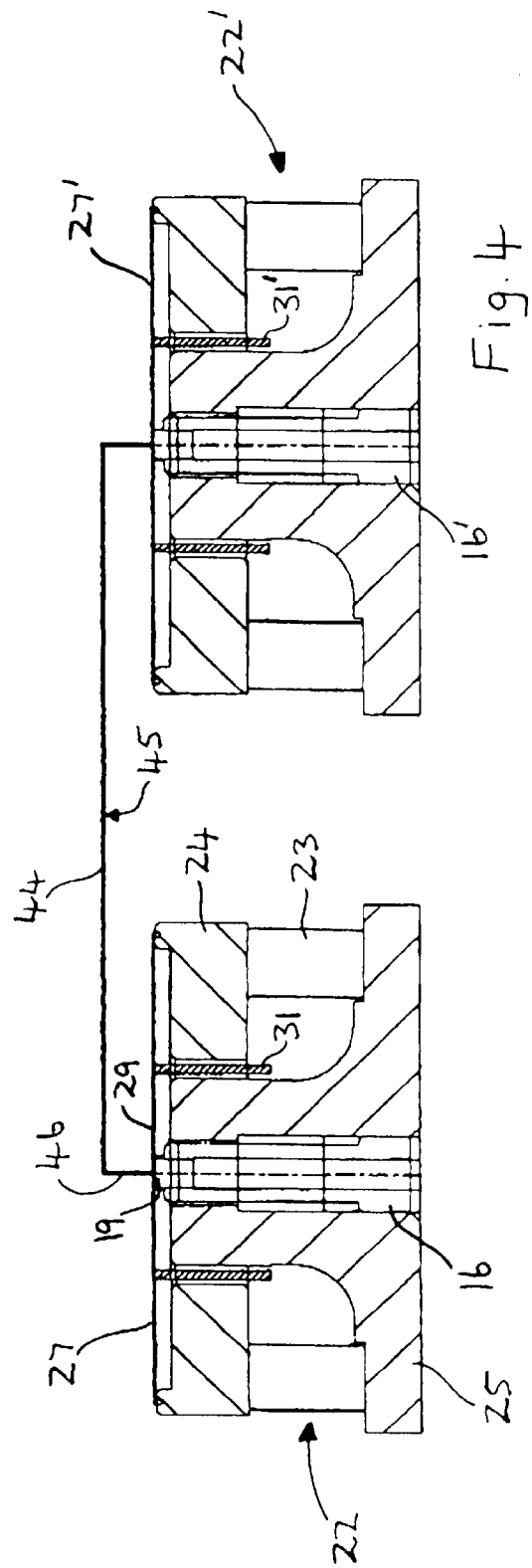

ELECTRIC-TO-PRESSURE CONVERTERS

FIELD OF THE INVENTION

This invention relates to electric-to-pressure converters, more commonly referred to in the art as "I/P Converters", which are pressure control instruments used to provide a fluid, usually compressed air, pressure output that is linearly or otherwise proportional to an electrical input signal.

BACKGROUND OF THE INVENTION

In one known type of I/P converter (hereinafter referred to as "an electromagnetic I/P converter of the type described"), the fluid pressure output is varied in dependence upon an electrical input signal applied to an annular electromagnetic coil which is operatively associated with a "flapper" that co-operates with a fluid exhaust nozzle. The coil co-operates with a permanent magnet assembly and assumes an axial position relative to the magnet assembly in dependence upon the magnitude of the electrical input signal. Thus, the flapper assumes a corresponding position nearer to or further from the exhaust nozzle, as the case may be, and creates a variable back pressure within the nozzle which, in turn, is dependant upon the magnitude of the electrical input signal. This back pressure determines, via a piston or diaphragm assembly, the degree of opening of the converter's main valve assembly and therefore the fluid output pressure of the converter.

In one commonly used construction of I/P converter of the type described, the electromagnetic coil is secured to the upper surface of one end of a lever pivotally mounted on a fulcrum and the other end of the lever carries the flapper on its lower surface, the flapper co-operating with the exhaust nozzle which is located below it. Such a construction is not particularly compact and suffers from the serious problem that, because it utilises a fulcrum/lever arrangement, it is very sensitive to external vibrations. This problem can be solved by providing a closed-loop control arrangement but the converter is then significantly more expensive to produce.

In an improved construction devised by us and which is embodied in our prior 100 Series I/P converters, the fulcrum/lever arrangement is replaced by an annular flexure fixedly secured at its periphery and having an integral flexible central portion that carries a separately formed flapper, the coil being mounted on the upper surface of the flexible central portion and the flapper co-operating with the fluid exhaust nozzle which is located below the central portion of the flexure. Whilst such a construction is less susceptible to external vibrations, it is not particularly compact.

It is an object of the present invention to provide an improved, relatively compact, cost-effective design of electromagnetic I/P converter of the type described that, especially, does not suffer to any significant extent from the problem associated with external vibrations whether or not it incorporates closed-loop control. As will become apparent, preferred features of the design afford other significant advantages over prior designs.

SUMMARY OF THE INVENTION

According to the present invention in its broadest aspect, there is provided an electromagnetic I/P converter of the type described, the improvement wherein the permanent magnet assembly comprises radially inner and outer pole pieces of opposite polarity located below a flexure having a spatially fixed peripheral portion and, flexibly connected to said peripheral portion, a central portion comprising the flapper, said pole pieces defining between them an annular space, said annular electromagnetic coil depending from the central portion of the flexure and being received in said annular space, and the fluid exhaust outlet being defined at an upper, open end of an elongate nozzle member extending within the inner pole piece coaxially relative to the annular space, the fluid exhaust outlet being located above the upper extremity of the inner pole piece and below the flapper.

BRIEF DESCRIPTION OF THE DRAWINGS

As will be described later, significant advantages arise by adopting the configuration defined above, and further advantages arise by adopting some or all of the preferred novel features illustrated, by way of example, in the accompanying drawings in which:

FIG. 3 is a sectional side elevation, on an enlarged scale, of an alternative electromagnetic coil/permanent magnet assembly suitable for incorporation in an I/P converter of the invention;

FIG. 4 is a sectional side elevation, on an enlarged scale, of a further alternative electromagnetic coil/permanent magnet assembly suitable for incorporation of an I/P converter of the invention;

FIG. 5b is a side elevation of the modified flexure shown in FIG. 5a.

DESCRIPTION OF THE PREFERRED EMBODIMENTS

Figure 1:
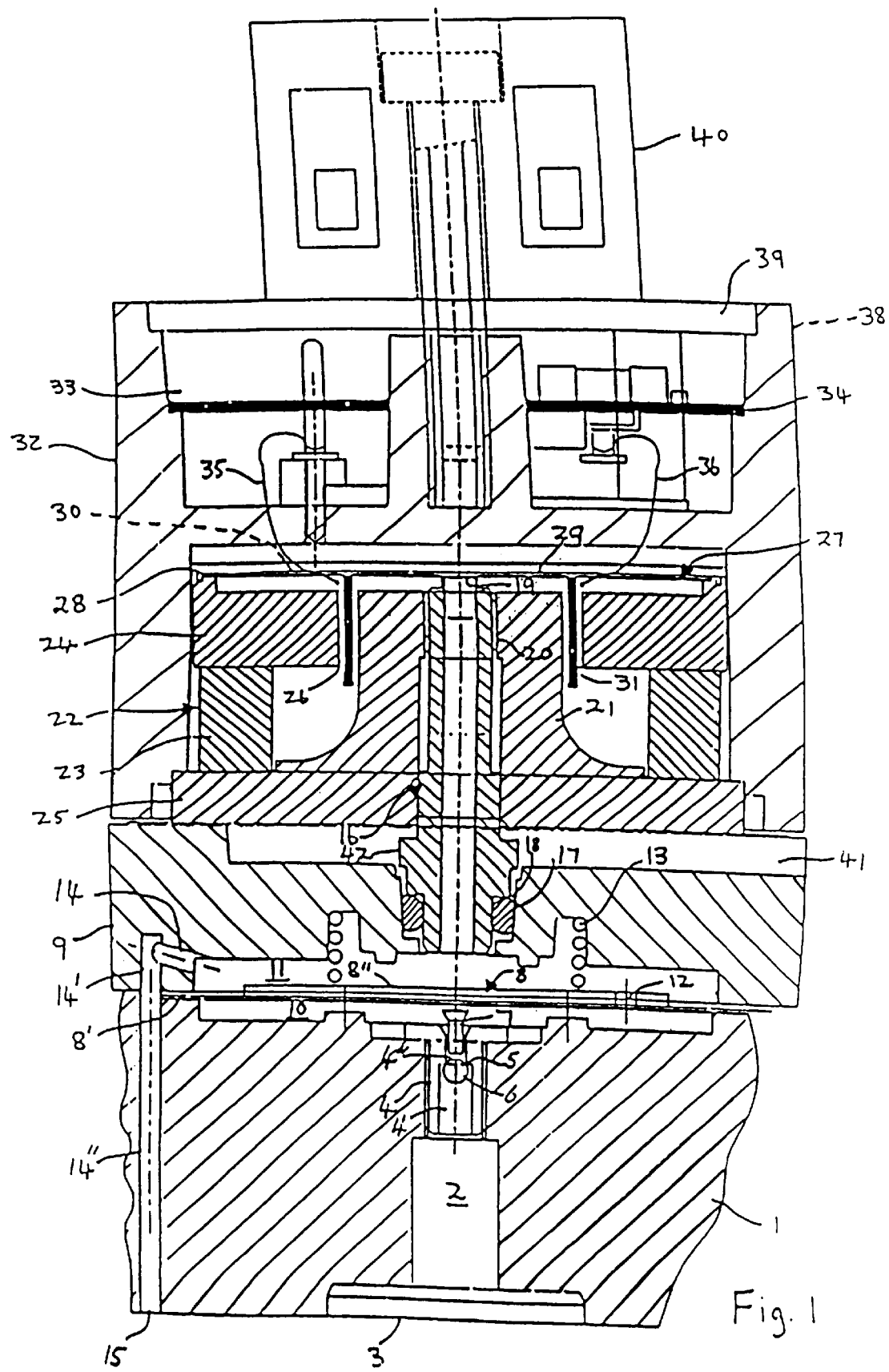
FIG. 1 is a sectional side elevation, to a scale of about 4:1, of one preferred embodiment of an I/P converter constructed in accordance with the invention.
Figure 2:
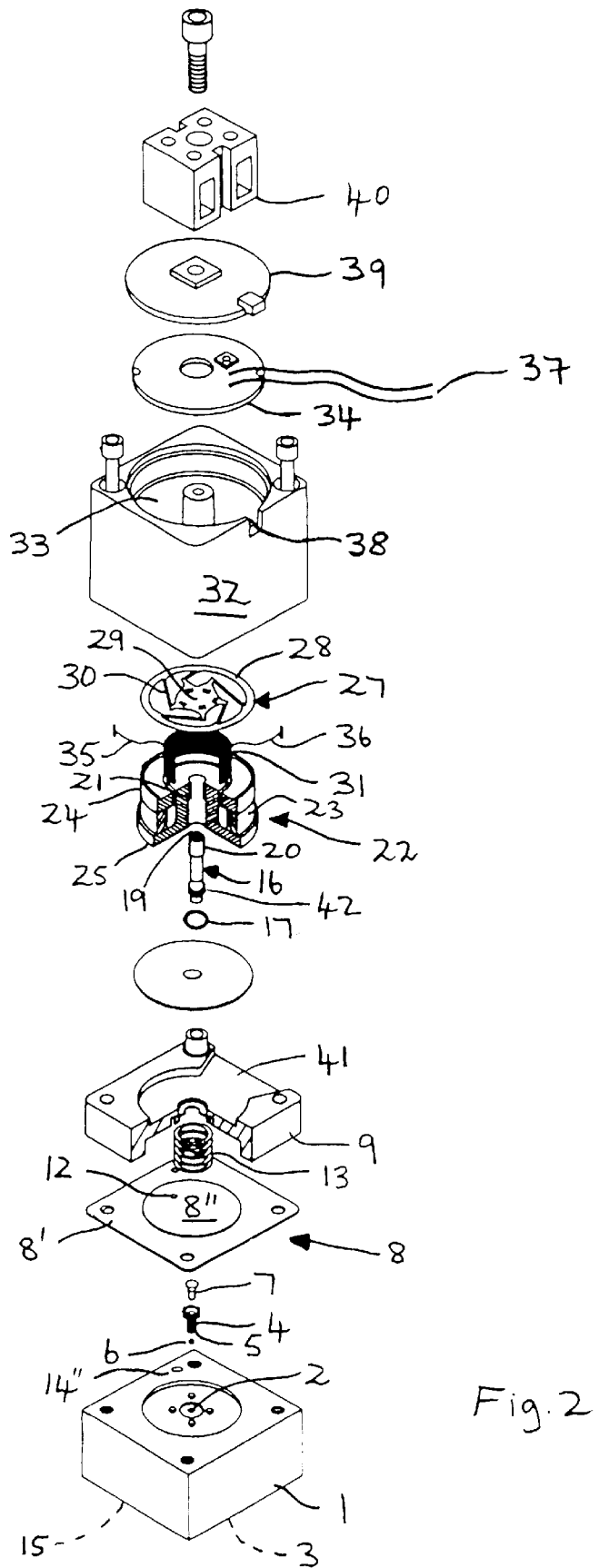
FIG. 2 is an exploded detailed isometric view of the I/P converter shown in FIG. 1, but drawn to actual size.

Referring to FIGS. 1 and 2 of the drawings, the I/P converter comprises a rectangular lower body portion 1 which defines a compressed air supply passageway 2 to which, in use, compressed air is supplied via an inlet 3 typically at a pressure within the range of from 20 to 150 p.s.i. The upper end of the supply passageway 2 has a valve screw-threadedly retained therein comprising a body 4 having stepped axial bores 4' and 4" defining at their juncture a seat 5, and a ball closure 6. As will be described in more detail later, the ball closure 6 is, in use, displaced from the seat 5 to a lesser or greater degree by a pin 7 slidably mounted in the bore 4" and acted upon by a diaphragm assembly 8.

The diaphragm assembly 8 is of composite structure comprising a rectangular lower support section 8' made of an elastomeric material having bonded to its upper surface a central metallic disc 8". The lower surface of the support section 8' acts on the pin 7. The periphery of the lower support section 8' of the diaphragm assembly 8 is sandwiched between the upper peripheral face of the lower body portion 1 and the lower peripheral face of an intermediate, rectangular body portion 9 and, together with recesses formed in, respectively, the upper face of the lower body portion 1 and the lower face of the intermediate body portion 9, define lower and upper chambers 10 and 11 respectively. The passageway 2 opens out into the lower chamber 10 via the seat 5/ball closure 6 and the bores 4', 4", and the chambers 10 and 11 are interconnected by a small drilling 12 in the disc 8" and the support section 8'. The diaphragm assembly 8 is biased in a downward direction by a small compression spring 13 seated on the disc 8".

The upper chamber 11 communicates with passageways 14, 14' formed in the intermediate body portion 9 which in turn communicate with a passageway 14" formed in the lower body portion 1. The passageway 14" terminates in a port 15 from which the pressure output signal of the converter issues, as will be described later. The upper chamber 11 further communicates with an elongate nozzle member 16 the lower end of which is mounted, by way of the O-ring seal 17, in an aperture 18 formed in the intermediate body portion 9 and the upper end of which terminates in an outlet 19 adjacent to an externally threaded portion 20.

The nozzle member 16 is, by means of the threaded portion 20 thereof, threadedly secured in an annular pole piece 21 of a permanent magnet assembly 22 which includes an annular permanent magnet 23. The other pole piece of the magnet assembly 22 is formed by an annular ring 24. The pole piece 21 has an annular basal portion 25 which is mounted on the intermediate body portion 9. The pole pieces 21 and 24 are spaced from one another so as to define between them an annular gap 26.

A one-piece low mass flexure 27 comprising a peripheral annular portion 28 and a central "flapper" portion 29 joined to the annular portion 27 by five flexible arms 30 etc (see FIG. 2 in particular) is securely mounted, by its peripheral portion 28, on the periphery of the annular magnet member 24. A cylindrical, formerless electromagnetic coil 31 is secured to the central portion 29 of the flexure 27 and depends freely into the annular gap 26.

The magnet assembly 22, flexure 27 and coil 31 are housed in an upper body portion 32 which has an upper recess 33 housing, in particular, a printed circuit board 34 that mounts minor electrical components and to which the two free ends 35 and 36 of the coil are connected. Referring in particular to FIG. 2, the printed circuit board 34 may in turn be connected directly to a flying lead 37 through which, in use, the electrical input signal is fed and which protrudes from the upper body portion 32 through a rectangular slot 38 formed therein. The slot 38 also serves as an exhaust port for air issuing from the outlet 19 of the nozzle member 16, as will be described later. The upper recess 33 is closed by a plate 39. Alternatively, the electrical input signal may be fed to the converter by wires connected to a terminal block 40 mounted on the plate 39.

Operation of the converter is, in principle, the same as other electromagnetic converters and so will be familiar to those skilled in the art. Briefly, however, it is as follows. Assume, initially, that no electrical input signal is present, ie the coil 31 is in a neutral position and thus the gap between the central portion 29 of the flexure 27 and the outlet 19 is at its maximum. Initially, the spring 13 applies a small net downward force to the diaphragm assembly 8 which, via the pin 7, displaces the ball 6 slightly away from the seat 5. Compressed air therefore flows, at a relatively low rate, from the air supply inlet 3 into the chamber 10 via the passageway 2. It also flows into the chamber 11 via the drilling 12 in the diaphragm assembly 8 and upwardly through the nozzle assembly 16 to the outlet 19. It then exhausts through the slot 38 at a rate that is controlled by the spacing between the central portion 29 of the flexure 27 and the outlet 19. A back pressure is established within the nozzle assembly 16, and therefore in the chamber 11, the magnitude of which back pressure varies inversely with the size of that spacing. Air in the chamber 11 provides, via the passageways 14, 14' and 14", an output pressure at the port 15. This output pressure, which is at its minimum value when there is no electrical input signal, is fed to the device being controlled (not shown) which may, for example, be a valve positioner of the diaphragm type. The output pressure will stabilise at a substantially constant value when the upward force acting on the diaphragm assembly 8 by virtue of the air pressure in the chamber 10 equals the downward force acting on it by virtue of the air pressure in the chamber 11 and the spring 13, whilst air continues to flow through the converter from the inlet 3 to the exhaust slot 38 at a more or less constant, low rate. As such, the pressure in the chamber 10 will exceed the pressure in the chamber 11 by an amount proportional to the downward force exerted by the spring 13. Typically, this will be of the order of 1 p.s.i.

Suppose now that an electrical input signal is applied to the coil 31. The coil 31 is attracted downwardly together with the central portion 29 of the flexure 27 whereupon the gap between the central portion 29 of the flexure 27 and the outlet 19 decreases and, in turn, the rate of air flow from the latter decreases. Hence, the back pressure in the nozzle assembly 16/chamber 11 increases whereby the diaphragm assembly 8 moves downwards and displaces the ball 6 further from the seat 5 so that a higher, stabilised output pressure is provided at the port 15.

The arrangement described provides an output pressure at the port 15 that is linearly proportional to the electrical input signal applied to the coil 31, ie. the higher the electrical input signal, the higher the pressure output. Usually, the electrical input signal will, in use, vary in accordance with the usual standards, say between 4 mA for the minimum working output pressure to 20 mA for the maximum working output pressure. The converter may be calibrated appropriately by adjusting the size of the spacing between the central portion 29 of the flexure 27 and the outlet 19, whilst the electrical input signal is at its minimum working value (say 4 mA), until the desired minimum working pressure output at the port 15 is achieved. This so-called "zero" adjustment of the converter may be carried out very simply by rotating the nozzle assembly 16 using a spanner which is inserted laterally through a slot 41 formed in the body portion 9 into the engagement with flats 42 formed adjacent to the lower end of the nozzle assembly 16 whereupon, because of its threaded engagement with the pole piece 21, the nozzle assembly 16, and in particular the outlet 19, moves towards or away from the central portion 29 of the flexure 27, as the case may be, until the desired minimum working output pressure is realised.

In an alternative, less preferred arrangement (not shown), zero adjustment of the spacing between the nozzle outlet 19 and the flexure 27 may be effected by user-adjustable means that bears on top of the central portion 29 of the flexure 27 and which adjusts the position of the central portion 29 when the electrical input signal is at its minimum working value of, say, 4 mA. In other words, that type of adjustment moves the central portion 29 of the flexure 27 relative to the outlet 19 rather than vice-versa.

Whilst, as noted earlier, the converter specifically described above generally functions like known I/P converters, it has a number of novel design features that, when used either alone or in combination in an I/P converter of the invention, afford certain advantages. Amongst these features we especially mention the following.

1. The interconnection between the chambers 10 and 11 is merely a drilling 12 rather than, as hitherto used in I/P converters, a separately formed restrictor which is a precision turned part that is relatively expensive to make.

2. The output pressure signal at the port 15 is taken from above the diaphragm assembly 8, rather than from below it as is usual. This has the advantage that the input signal:output pressure tend to be more linear. Further, reduction of the converter's output pressure in response to a lower electrical input signal occurs more quickly because air in the chamber 11 can exhaust directly and quickly via the nozzle outlet 19 and the slot 38 without having to pass through the small drilling 12.

3. The screw-threaded mechanism for effecting zero adjustment of the converter is simpler and more accurate than previously known and used arrangements.

4. The valve mechanism constituted by the seat 5, ball 6 and pin 7 is simpler and less expensive to make than the so-called "pintle-valve" arrangement hitherto usually used.

5. Because the converter is more in the nature of a pilot, ie. low flow, valve, as distinct from a full-flow converter, the diaphragm assembly 8 may be of single construction, as illustrated in the drawings, rather than of double construction. Obviously, this contributes to compactness and has cost advantages.

6. Of especial advantage is the location of the annular coil 31 and the exhaust outlet 19 on the same, lower side of the flexure 27, which results in a more compact and stable arrangement compared to known designs.

7. Adoption of, in particular, the features referred to in paragraph numbers 1, 3 and 5 above results in fewer parts than are present in conventional I/P converters, as does the use of the flexure 27 having an integrally, rather than separately, formed central flapper portion 29 and the use of a formerless coil 31.

8. The output pressure of the converter is relatively insensitive to fluctuation in the supply pressure. This is because the area of the bore 4" is very small relative to the area of the diaphragm assembly 8.

Further, we have found that the converter specifically described with reference to the drawings has very good vibration performance and this may be optimised by using a strong permanent magnet assembly 22, a formerless, and therefore low mass, coil 31 and a stiff flexure 27. A corollary of this, however, is that a high frequency resonance problem may arise but this may be readily solved by connecting a capacitor (not shown but which may be mounted on the printed circuit board 34) in parallel across the coil 31. Also, by optimising the vibration performance by using, in particular, a stiff flexure 27, it is possible for the manufacturer to calibrate the instrument and it should be unnecessary for the user to have to recalibrate it during commissioning.

The sensitivity and power consumption of the converter described may be significantly improved by reducing the diameter of the exhaust outlet 19 and/or by using small gauge wire for the coil 31, whereby for the same size of coil more turns may be used. This increases the coil's electrical resistance and, for a given input signal current, the voltage drop across the coil will be greater which better suits the electronic circuitry typically used to generate the electrical input signal that controls operation of I/P converters of the type described. By making those adjustments, we have been able to construct an I/P converter in accordance with the invention having a power consumption of as little as 1 to 2 mW which is considerably lower than the consumption of converters currently available. As such, it could be powered by an optical primary signal, via a suitable opto-electrical transducer, transmitted for example along an optical fibre.

A further reduction in power consumption, other things being equal, may be achieved by using a bipolar input current signal rather than the usual unipolar signal. For example, in the case where a 1 mA unipolar signal is required to give the desired increased output pressure, the same result may be achieved by applying a bipolar signal varying between −0.5 mA and +0.5 mA. As those skilled in the art will appreciate, the power consumed in applying such a bipolar signal will be about one quarter of that consumed in applying a 1 mA unipolar signal. Usually, the external input signal will be unipolar, but any one of a number of simple electronic circuits may be used (for example incorporated in the I/P converter itself) to convert a unipolar signal into a bipolar one.

It is desirable for I/P converters to produce, at the same input signal, a pre-determined output pressure regardless of the position, i.e. orientation, in which it is installed. That is to say that it is desirable for operation of an I/P converter to be positionally independent. The I/P converter depicted in FIGS. 1 and 2 is positionally dependent, although. with a given input signal, the variation of output pressure of the converter when installed in different orientations may be minimised by, for example, using a stiff flexure as is described above.

The reason for this positional dependence is that, because of the action of gravity on the coil 31 mass in particular, the spacing between the central region 29 of the flexure 27 and the nozzle outlet 19 will, other things being equal, vary depending on the orientation of the converter. Thus, for example, if the converter were inverted from its normal upright position as shown in FIGS. 1 and 2, that spacing would increase and the output pressure would fall notwithstanding the application of the same input signal to the coil 31.

Positional independence may be substantially achieved by adopting one or other of the arrangements shown in FIGS. 3 and 4 of the accompanying drawings in which parts similar to those in FIGS. 1 and 2 bear the same, respective reference numerals.

In FIG. 3, the mass of the coil 31 is more or less exactly counter-balanced by a mass 43 fixed to one end of a beam 44 pivotally secured to a fulcrum 45. The other end of the beam 44 is attached by a linkage 46 to the upper surface of the central portion 29 of the flexure 27. Accordingly, other things being equal, the spacing between the central portion 29 of the flexure 27 and the nozzle outlet 19 will remain substantially constant regardless of the orientation of the converter.

In FIG. 4, the mass of the coil 31 is similarly counter-balanced but in this case by a second, identical coil 31' associated with an identical flexure 27', permanent magnetic assembly 22' and nozzle member 16'. This arrangement has the further advantage that, by simultaneously applying the same input signal, but of opposite polarity, to the coils 31 and 31' respectively, the power consumption is about half that required to produce a given output pressure using the single coil arrangement shown in FIGS. 1, 2 and 3. The power efficiency can be further improved by using a bipolar input signal as described earlier. Indeed, by using the arrangement shown in FIG. 4 in a converter otherwise as depicted in FIGS. 1 and 2, the power consumption using a bipolar input signal will be about one eighth of that of the converter shown in FIGS. 1, 2 and 3, say of the order of 250 μW.

Figure 5A:
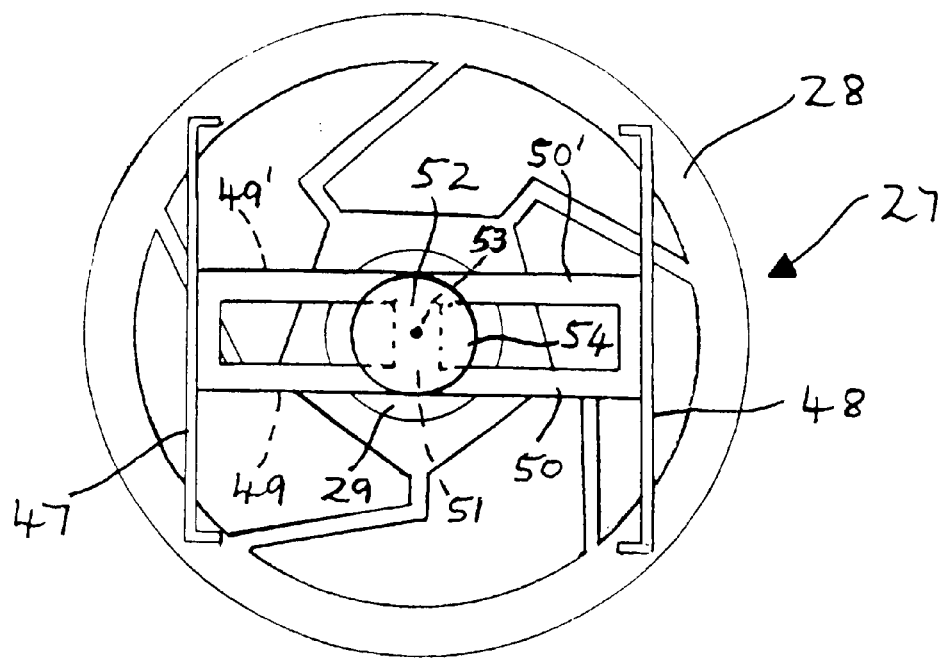
FIG. 5a is a plan view, on an enlarged scale, of a modified flexure suitable for incorporation in an I/P converter of the invention.
Figure 5B:
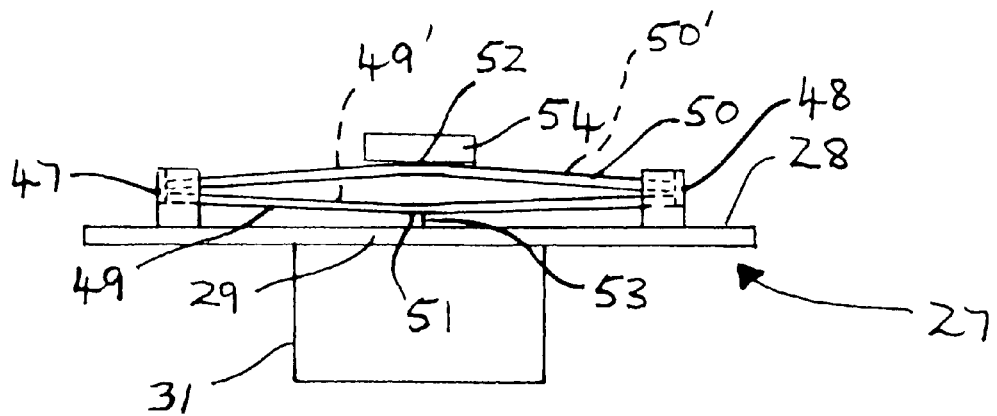

FIGS. 5a and 5b show an alternative, compact flexure arrangement for rendering an I/P converter of the invention, and especially one as described with reference to FIGS. 1 and 2, positionally independent and also largely vibration-insensitive. Here, opposed regions of the peripheral portion 28 of the flexure 27 have firmly secured to their upper surfaces the opposed ends of a pair of metallic, eg. phosphor-bronze, strips 47 and 48 which are spaced from the flexure and can flex slightly in a radial direction (relative to the plane of the flexure 27) but which are torsionally stable. Bridging, and firmly secured to a central region of each strip 47 and 48, are a lower pair of flexible metal strips 49 and 49' and an upper pair of flexible metal strips 50 and 50', also made for example of phosphor-bronze. Each of the lower and upper pairs of strips 49, 49' and 50, 50' are bridged centrally by integral transverse members 51, 52 respectively.

The lower transverse member 51 is rigidly linked to the upper surface of the central portion 29 of the flexure 27 by a pin 53, whereas the upper transverse member 52 securely supports a mass 54 substantially equal to the mass of the coil 31 which is supported by the flexure 27. As can be seen from FIG. 5b, each of the lower strips 49 and 49' is, in side elevation, V-shaped whereas the strips 50 and 50' are of inverted V-shape. The afore-described arrangement constitutes a balanced couple in which the position of the central portion 29 of the flexure 27, at a given input signal, remains substantially constant regardless of the orientation of the I/P converter. It also renders the output pressure substantially insensitive to vibration at most frequencies likely to be encountered in practice.

As previously noted, the constituent strips of the couple are preferably made of phosphor-bronze and they may be integrally formed with one another by, for example, known chemical milling techniques. Indeed, the flexure 27 and the couple may be manufactured as an entirely integral unit using such techniques.

Finally, whilst for many applications the converters specifically described above will be sufficiently accurate, their accuracy may be improved by providing closed loop control using an output pressure transducer and closed loop feedback in accordance with known arrangements. Because, as noted above, the converter may have a very low power consumption, most of the energy of the 4–20 mA electrical input signal would be available for powering the closed loop control electronics which makes the latter's design more flexible and into which, in particular, "Smart" and "Fieldbus" features could be incorporated.

I claim:

1. An I/P converter for providing a fluid pressure output the magnitude of which is dependent upon the magnitude of an electrical input signal, the converter including a nozzle member having a fluid exhaust outlet, a flapper connected to an annular electromagnetic coil to which the electrical input signal is fed, and a permanent magnet assembly operatively associated with the coil whereby the flapper assumes a position relative to the fluid exhaust outlet in dependence upon the magnitude of the input signal thus creating a variable fluid back pressure in the nozzle member, the magnitude of which back pressure determines the fluid pressure output of the converter, the improvement wherein the permanent magnet assembly comprises radially inner and outer pole pieces of opposite polarity located below a flexure having a spatially fixed peripheral portion and, flexibly connected to said peripheral portion, a central portion comprising the flapper, said pole pieces defining between them an annular space, said annular electromagnetic coil depending from the central portion of the flexure and being received in said annular space, and the fluid exhaust outlet being defined at an upper, open end of an elongate nozzle member extending within the inner pole piece coaxially relative to the annular space, the fluid exhaust outlet being located above the upper extremity of the inner pole piece and below the flapper.

2. An I/P converter according to claim 1 wherein said elongate nozzle member is screw-threadedly engaged in a bore formed in said inner pole piece whereby, for the purpose of calibrating the converter, the position of the fluid exhaust outlet relative to the flapper may be varied appropriately by manually rotating the nozzle member.

3. An I/P converter according to claim 1 wherein the electromagnetic coil is a formerless coil.

4. An I/P converter according to claim 1 wherein the flexure is formed in one piece from thin sheet material, the central portion thereof being connected to the peripheral portion thereof by a plurality of flexible legs.

5. An I/P converter according to claim 4 wherein the flapper is constituted by the central portion itself of the flexure.

6. An I/P converter according to claim 1 which is adapted to be positionally insensitive by providing balance means operable to balance the mass of the electromagnetic coil whereby, with a given electrical input signal, the position of the central portion of the flexure relative to the exhaust outlet remains the same irrespective of the orientation of the converter.

7. An I/P converter according to claim 6 wherein said balance means comprises a balance arm pivotally mounted on a fulcrum, one end of said arm being attached to the upper surface of said central portion of the flexure and the other end of said arm carrying a mass substantially equal in magnitude to the mass of the electromagnetic coil.

8. An I/P converter according to claim 7 wherein said mass comprises a second annular electromagnetic coil which is associated with a second flexure, a second permanent magnetic assembly and a second fluid exhaust outlet.

9. An I/P converter according to claim 6 wherein said balance means comprises a mass substantially equal in magnitude to the mass of the electromagnetic coil, said mass being positioned above the flexure and connected to the upper surface of the central portion of the flexure via a mechanical couple fixedly mounted on the periphery of the flexure.

10. An I/P converter according to claim 1 including circuit means to adapt a unipolar electrical input signal into a bipolar electrical input signal.

11. An I/P converter according to claim 1 wherein the lower open end of the nozzle member communicates with an upper chamber defined in part by one side of a diaphragm, the other side of the diaphragm defining in part a lower chamber which is in communication with the upper chamber and with the fluid inlet to the converter via an inlet valve, the inlet valve being actuated by the diaphragm and its degree of opening being controlled by the position of the diaphragm as determined by the back pressure created in the nozzle member and thus in the upper chamber, the fluid pressure outlet being taken from said upper chamber and equating to the fluid pressure therein when the diaphragm has assumed an equilibrium position.

12. An I/P converter according to claim 11 wherein said inlet valve comprises a spherical closure co-operating with a valve seat, said closure being displaceable from the valve seat by a pin extending between the spherical closure and the lower side of the diaphragm.

13. An I/P converter according to claim 11 wherein said diaphragm comprises a single flexible membrane having a reinforced central region, said central region having an aperture therein for providing fluid communication between said upper and lower chambers.

* * * * *